May 25, 1926.
A. ARATO
1,585,753
STEERING GEAR FOR FOUR-WHEEL TRAILED VEHICLES
Filed Sept. 22, 1925
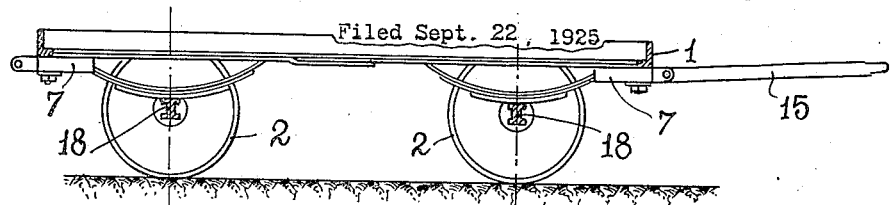
Fig.1
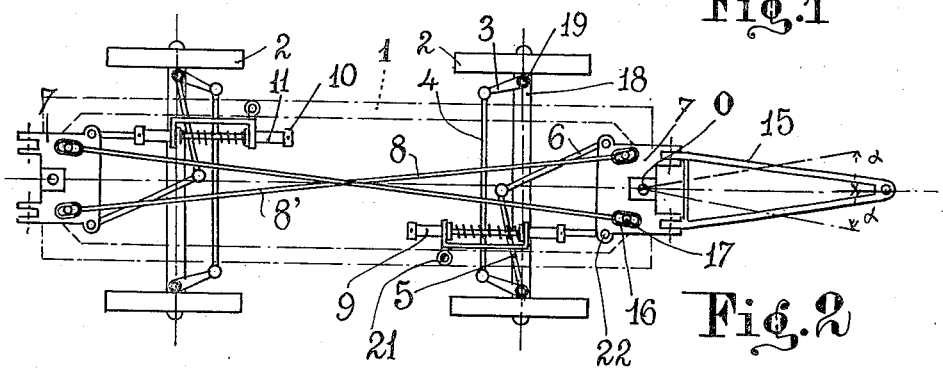
Fig.2
Fig.3
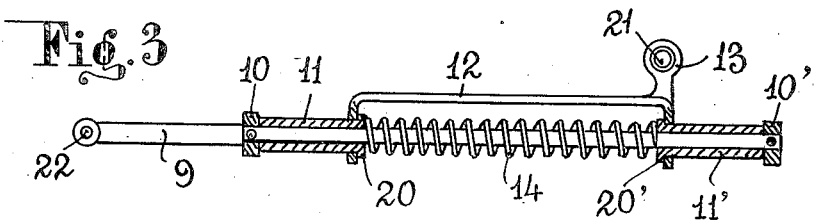
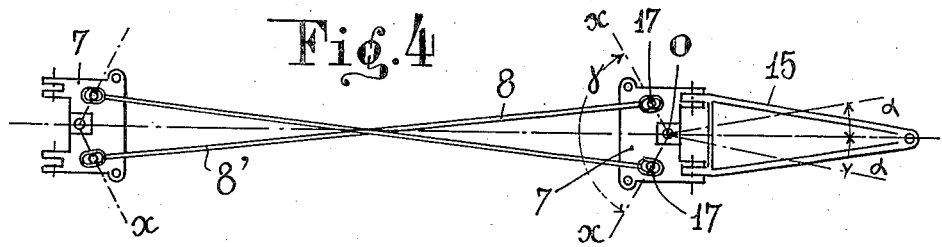
Fig.4
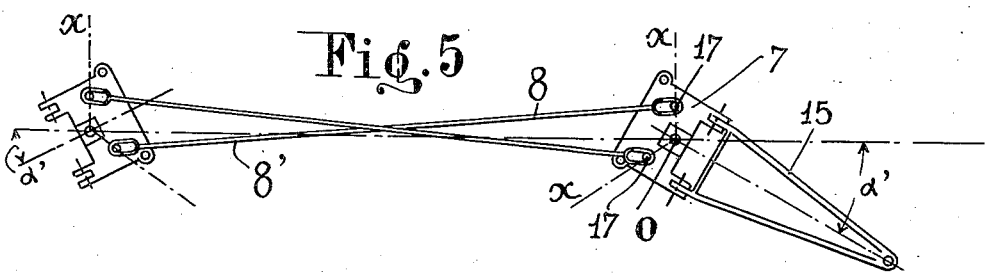
Fig.5
Inventor
A. Arato
by Langner, Parry, Card & Langner
Attys.

Patented May 25, 1926.

1,585,753

UNITED STATES PATENT OFFICE.

ACHILLE ARATO, OF KIEL, GERMANY.

STEERING GEAR FOR FOUR-WHEEL TRAILED VEHICLES.

Application filed September 22, 1925, Serial No. 57,929, and in Italy October 7, 1924.

The present invention relates to four wheel trailed vehicles in which the wheels are steered by means operated by a trailing vehicle and the deviation of front wheels produced by a pole bar connected with the trailing vehicle is imparted also to rear wheels in such a manner as to obtain a correct turn of the trailed vehicle.

The present invention has for its object a steering device for trailed vehicles of said kind in which the action of accidental deviations of said pole bar is prevented and the swinging members of the steering device are yieldingly prevented from oscillating, this feature preventing the trailed car from hunting and being put quickly out of service.

On the annexed drawing is shown diagrammatically an example of a construction of the gear according to the present invention, and Figure 1 is a longitudinal section of a car equipped with the present invention;

Figure 2 is a plan view of the same;

Figure 3 is a separate detail;

Figures 4 and 5 show the diagrams of positions of connecting parts between swinging members mounted at the car ends.

In the construction illustrated in Figures 1 and 2, 1 is the frame of the trailed vehicle and 2 are the wheels carried by axles 18 and swivel members 19; the wheels of each axle are connected in pairs by means of arms 3 and links 4 for steering movements.

One of swivel members of each pair of wheels is connected by means of arms 5 and rod 6 with a yoke 7 pivoted on the adjacent end cross bar of the car, and the two yokes 7, 7 are interconnected by means of crossing bars 8, 8.

According to the present invention each yoke 7 is held resiliently in its intermediate position with the associate wheels in position for straight running and the interconnection of said yokes is such as each yoke is independent of the deviations of the other one which are less than a given angle.

In the embodiment illustrated each yoke 7 is pivotally connected at a point 22 distinct of its centre of oscillation —o— with a rod having collars 10, 10' fastened thereon and spaced apart from each other, the portion of said rod between said collars being encircled by sleeves 11, 11' and by a spring 14 acting on said sleeves to hold them resiliently spaced from each other. Said sleeves 11, 11' have their facing ends provided with flanges 20, 20' and are slidably embraced by a supporting member 12 which has an eye 13 pivoted at 21 on the car frame 1 (see Figures 1 and 3).

In such an arrangement the rod 9, when moved towards left in Figure 3, moves with it the sleeve 11' by compressing the spring 14 against sleeve 11 which is engaged by its flange 20 with the member 12, while the displacement of said rod 9 towards right produces a similar movement of sleeve 11 which compresses the spring 14 while sleeve 11' is held stationary by its flange 20'; therefore the spring 14 acts at any time to carry the sleeves 11, 11' with rod 9 and co-operating yoke into their normal position in which the steering wheels 2 connected with said yoke are held in their position for straight running of the car.

The spring connection intended to hold normally each yoke in its normal position may be embodied in any other suitable manner within the confines of appended claims, being only essential that yokes 7 and co-operating steering parts are prevented from oscillating during the straight running of the car under the action of unevennesses of the road and accidental movements of the trailing means.

In order to prevent the small deviations produced on the front of the yoke 7 by its pole bar 15 which is connected with the trailing vehicle (not shown) from being imparted to the rear one and associate wheels, said rods 8, 8' are connected with yokes 7, 7' with lost motion by providing one or both ends of said rods with elongated slots 16 in which is engaged a pin 17 connected with each yoke.

By such an arrangement the front yoke is enabled to oscillate through a given angle without imparting motion to the rear yoke, and the steering gear is thus not caused to operate on the trailer front wheels until the car is required to run on a turn having a radius less than a given value, this feature reducing the deviations of the trailer with respect to correct travel on account of accidental oscillations of the pole bar.

In order to prevent said lost motion in the interconnections of yokes from effecting a correct and full transmission of deviations when rear wheels must be steered, the pins 17 are arranged in such a manner with respect to the center of oscillation —o— of said yoke, that the lines —x—o—x— connecting said pins with said center provide an obtuse angle —γ— opening towards the intermediate portion of the car. Then, when the front yoke 7 connected with the pole bar 15 is deviated from intermediate or straight-running position, the projection of the stroke of one of pins 17 of front yoke 7 on the axis or direction of cooperating rod 8 or 8' is larger than the projection of the stroke of the pin 17 of rear yoke 7 on the same line, because in the front yoke the line x—o tends to become perpendicular to cooperating rod while the same rod and cooperating pin 17 of rear yoke come away from respective perpendicularity, and thus the rear yoke and associate steering parts are moved correctly through the same angle as the front yoke because the larger extent of motion imparted by front yoke pin 17 to its associate rod 8, 8' compensates for the initial lost motion between the last named members. Therefore on the pole bar and front yoke being oscillated, either of rods 8, 8' is moved to a larger extent than the other one and it actuates the rear yoke to the full extent of deviation imparted to the front yoke, thus compensating for the lost motion provided by slots 16 and causing the four wheels to be properly steered through the same angle while said slots 16 provide for the free and correct movements of parts irrespective of the different extents of movements of said rods.

Such an operation is made clear by Figures 4 and 5, where it is apparent that the rear yoke is not oscillated in respect of deviations having the angular movement or the width of angle —α— made by the pole bar 15, while when said deviations are larger, say —α'— they are entirely imparted to the rear yoke.

Owing to the resilient connection which holds each yoke in its intermediate normal position and to the lost motion in the interconnection of the two yokes, the oscillations of the pole bars and its deviations of small size have no effect or action on the steering members which at all times tend to come back in their normal intermediate position, while the required steering motion is correctly imparted to the four vehicle wheels.

What I claim as my invention and desire to secure by United States Letters Patent is:

1. In a trailed vehicle having two pairs of steering wheels, steering means for each pair of wheels, spring means between the vehicle frame and said steering means yieldingly holding the same and associate wheels in straight-running position and means operatively interconnecting, with lost motion, the steering means of the two pairs of wheels.

2. In a trailed vehicle having two pairs of steering wheels, steering means for each pair of wheels, spring means acting on steering means of each wheel pair to yieldingly hold the same and associate wheels in straight-running position, means operatively interconnecting, with lost motion, the steering means of the two pairs of wheels, and means compensating for said lost motion for a full transmission of steering movements beyond a given angle.

3. In a trailed vehicle having two pairs of steering wheels, steering means for each pair of wheels, spring means between the vehicle frame and said steering means of each wheel pair to yieldingly hold the same and associate wheels in straight-running position, means operatively interconnecting, with lost motion, said steering means of the two pairs of wheels, and means compensating for said lost motion for a full transmission of steering movements beyond a given angle.

4. In a trailed vehicle having two pairs of steering wheels, a steering member for each wheel pair, a rod connected with each steering member, a support connected with the vehicle frame and slidably supporting said rod, a spring embracing said rod within said support, parts slidable on said rod and each engaging one end of said spring and abutting against a portion of said support, means on said rod making it solid with either of said parts in the longitudinal movement of said rod in said support, and means operatively interconnecting with lost motion said steering members.

5. In a trailed vehicle having two pairs of steering wheels, a steering member for each wheel pair, a rod connected with each steering member, a support connected with the vehicle frame and slidably supporting said rod, a spring embracing said rod within said support, parts slidable on said rod and each engaging one end of said spring and abutting against a portion of said support, means on said rod making it solid with either of said parts in the longitudinal movement of said rod in said support, means operatively interconnecting with lost motion said steering members, and means for compensating for said lost motion for a full transmission of steering movements beyond a given angle.

6. In a trailed vehicle having two pairs of steering wheels, a steering member for each wheel pair, spring means for each steering member to hold the same and associate wheels in straight-running position, and crossing rods interconnecting said steering members by pin and elongated-slot connection.

7. In a trailed vehicle having two pairs of steering wheels, a steering oscillating member for each wheel pair, spring means for each steering member to hold the same and associate wheels in straight-running position, two pins on each of said steering member said pins being arranged on radii from the center of oscillation of the respective steering member enclosing an obtuse angle opening towards the other steering member in the straight-running position of the same members and crossing rods having elongated slots engaging said pins with lost motion for interconnection of said members.

In testimony whereof I have signed my name to this specification.

ACHILLE ARATO.